May 30, 1933.  W. NEAL  1,911,462
WATERLESS GAS HOLDER
Filed July 16, 1931
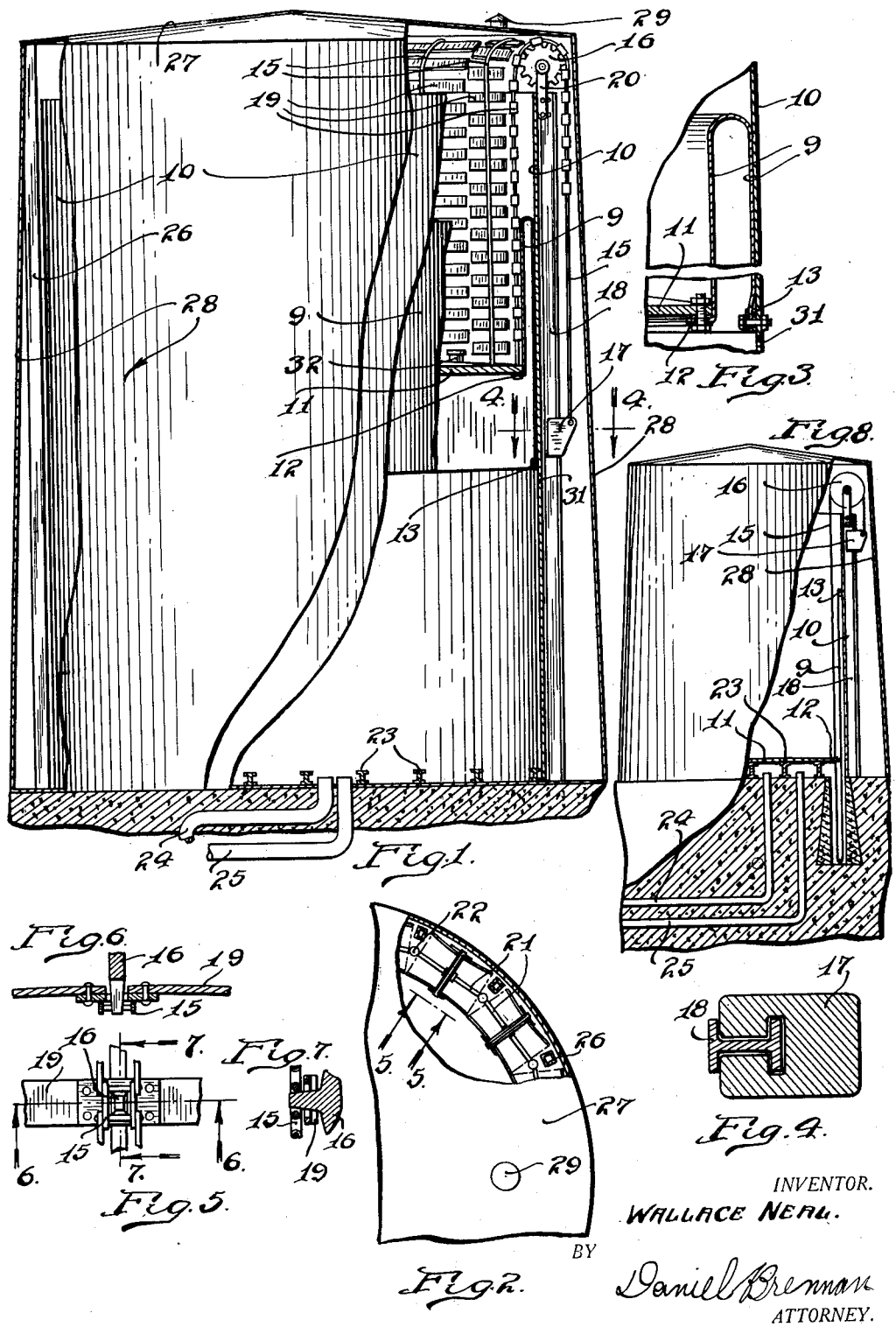
INVENTOR.
WALLACE NEAL.
BY Daniel Brennan
ATTORNEY.

Patented May 30, 1933

1,911,462

UNITED STATES PATENT OFFICE

WALLACE NEAL, OF DETROIT, MICHIGAN, ASSIGNOR OF ONE-HALF TO WALTER A. BEIER, OF DETROIT, MICHIGAN

WATERLESS GAS HOLDER

Application filed July 16, 1931. Serial No. 551,284.

The invention relates to improvements in gas tanks or reservoirs for storing, and regulating the pressure of, illuminating gas for domestic and industrial uses.

The principal object of the invention is to provide an improved illuminating gas tank with a flexible seal connecting the follower-head and the tank proper, which entirely eliminates the necessity of the use of friction shoes or water as sealing agencies.

Another object is to provide an improved gas tank with an adjustable sealing means that will be easy to manufacture, simple to install, and economical to maintain.

Another object of the invention is to provide a flexible dry seal between the follower-head and the walls of the tank, and means for maintaining the dry seal in perpendicular alignment, and means for maintaining the follower-head in horizontal alignment.

The foregoing and such other objects of the invention as will appear hereinafter as the description proceeds will be more readily understood from an examination of the following specification, reference being had to the accompanying drawing, in which;

Fig. 1 is a side elevational view of a gas tank embodying the improved structure, with sides partly broken away.

Fig. 2 is a fragmentary top plan view, with a portion of the roof broken away, showing how sprockets are mounted.

Fig. 3 is a fragmentary vertical sectional view, showing the flexible sealing member, and means for attaching the same to the follower-head and the inside of the tank.

Fig. 4 is a horizontal sectional view of one of the supporting columns, showing its use as a guide for the counter-weights.

Fig. 5 is a top plan view of one of the chain links showing method of attaching slats thereto.

Fig. 6 is a horizontal sectional view of one of the chain links and slats, taken substantially on line 6—6 of Fig. 5.

Fig. 7 is a sectional view of one of the chain links, taken substantially on line 7—7 of Fig. 5.

Fig. 8 illustrates a slightly modified form of gas tank, showing the same type of flexible sealing member projecting below the ground level.

In supplying gas to industrial and domestic users, it is important that a relatively constant pressure be maintained in the pipe lines. It is impossible to obtain a constant flow of gas through the pipe lines direct from the pumps, so it has been the practice to install at various locations in a community, gas tanks or reservoirs with means associated therewith for controlling the pressure.

The means for controlling the pressure usually consists of a follower-head of predetermined weight, suspended within the tank, and means for counter-balancing the said follower-head. This follower-head automatically raises and lowers as the cubic content of the gas in the tank is increased or decreased.

In the conventional type of gas tank, the follower-head is sealed from the tank proper, either by slidable friction shoes or by means of a water seal. In the latter method, it is necessary to maintain the proper water level and provide means for keeping the water from freezing.

In the improved type of gas tank, embodying my invention, I use the usual form of tank made of heavy gauge sheet metal riveted or welded together and anchored to a suitable base in such manner as to be air and gas tight.

My invention consists primarily in providing a collapsible and flexible sealing member 9, which, circumferentially extends around the follower-head 11, and attaches to the periphery of the said follower-head as at 12, and to the interior of the tank 10, by suitable means as shown at 13. The joints between the follower-head 11 and the wall of the tank 10, and the flexible sealing member 9, are made air and gas tight by cementing, or by means of gaskets held by bolts and nuts, or similar means. The flexible sealing member 9 may consist of a non-porous specially treated fabric, or a thin flexible metal, or of any other suitable material which is impervious to air and gas.

The sealing member 9 is interposed between the tank 10 and the follower-head 11 in such manner as to allow the follower-head 11 to be moved perpendicularly within the tank, yet prevent the escape of gas or the entrance of air around the periphery of the follower-head.

The follower-head 11 is suspended within the tank 10 by means of a multiplicity of chains 15, which engage multiplicity of sprockets 16, mounted by means of adjustable brackets 20 at or near the top of supporting columns 18. Counter-weights 17 are securely fastened to the ends of the chains 15, and are of such weight as to counter-balance the weight of the follower-head 11. The columns 18 are substantially H shaped in cross-section, and are adapted to act as guides for the perpendicular movement of the counter-weights 17, as suggested in Figure 4.

An inlet pipe 25 and an outlet pipe 24 are positioned in the base of the tank in order to allow gas to be forced into and out of the tank under the follower-head 11. As gas is pumped into the tank it automatically raises the follower-head 11, and as it is withdrawn the follower-head 11 is automatically lowered. I beams 23 form a landing chair for the follower-head on the base of the tank.

As gas is pumped into the tank, the pressure exerted thereby would have a tendency to distort and bulge the flexible sealing member 9, and in order to prevent the unnecessary bulging of said flexible sealing member 9, and to keep the side adjacent the follower-head 11 in perpendicular alignment, a multiplicity of segmental slats 19 are fastened and spaced apart on chains 15, by means of plates and bolts, as suggested in Fig. 6. The segmental slats are each staggered in relation to the slats on the adjacent chain. The segmental slats 19 are slightly curved to conform to the general contour of the inner walls 10 of the tank.

The side of the flexible sealing member 9 adjacent to the wall 10 of the tank, will naturally be held in alignment by the wall 10 of the tank.

The sprockets 16 are mounted by means of adjustable brackets 20 to the supporting columns 18, and are tied together by means of shafts 21 and universal joints 22, as shown in Fig. 2, and adapted to engage the chains 15 in such a way as to cause uniform perpendicular movement of the follower-head 11, and to prevent its becoming cocked at an angle relative to the tank.

The entire structure may be completely enclosed within an exterior shell 28 and a roof 27, the latter being supported by trusses 26.

A safety valve 32 is mounted on the follower-head 11, and to allow the tank to be purged of air, an adjustable air opening 31 is provided below the seal 13.

It is apparent that various modifications of the structure embodying my invention can be made, one of which is suggested in Fig. 8, but the preferable structure is herein disclosed, in which

I claim:

1. In combination with a waterless gas holder having an outer shell and an inner wall and a follower-head adapted to perpendicular movement therein, a sheet of flexible material impervious to air and gas, interposed between the periphery of said follower-head and the inner wall of said gas holder, and means for sealing the joints between the follower-head and the said sheet of flexible material, and the inner wall of the gas holder, means for suspending said follower-head within the holder, which means comprise a plurality of chains adapted to engage a plurality of sprockets mounted on top of the said inner wall, said chains supporting the follower-head on one side of said wall and counter-weights on the other side of said wall, and said chains carrying a plurality of segmental slats intermediate their ends, said slats being adapted to maintain the flexible material in perpendicular alignment.

2. A waterless gas holder comprising in combination a base, intake and outlet pipes in said base, side walls sealed to said base, a follower-head suspended so as to be moveable within said side walls, a frictionless seal between the follower-head and the side walls, said frictionless seal comprising a sheet of flexible material impervious to air and gas, connected directly to the periphery of the follower-head and the side walls, a plurality of chains adapted to engage a plurality of sprockets keyed to a common shaft mounted on top of said side walls, said chains supporting the said follower-head on the interior of said side walls, counter-weights on the other side of said side walls, and a multiplicity of segmental slats intermediate their ends, said segmental slats being adapted to shape the said sheet of flexible material.

3. In a waterless gas holder in combination a base, inlet and outlet pipes in said base, side walls, a follower-head within said side walls, a frictionless seal comprising a sheet of flexible material between the said follower-head and said side walls, a plurality of chains supporting said follower-head on one side of said side walls and counter-weights on the other side of said side walls, said chains being adapted to engage a plurality of sprockets keyed to a common shaft mounted on said side walls, said chains and sprockets being adapted to maintain the follower-head in substantial horizontal alignment.

In testimony whereof I affix my signature at 3400 Union Trust Building, Detroit, Michigan.

WALLACE NEAL.